(12) United States Patent
Hsu

(10) Patent No.: US 11,000,353 B2
(45) Date of Patent: May 11, 2021

(54) TEETH WHITENING APPARATUS

(71) Applicant: Beyond International, Inc., Stafford, TX (US)

(72) Inventor: Andy Hsu, Sugar Land, TX (US)

(73) Assignee: Beyond International, Inc., Sugar Land, TX (US)

(*) Notice: Subject to any disclaimer, the term of this patent is extended or adjusted under 35 U.S.C. 154(b) by 0 days.

(21) Appl. No.: 16/044,481

(22) Filed: Jul. 24, 2018

(65) Prior Publication Data
US 2020/0030069 A1 Jan. 30, 2020

(51) Int. Cl.
*A61C 19/06* (2006.01)
*A61C 17/20* (2006.01)

(52) U.S. Cl.
CPC ............ *A61C 17/20* (2013.01); *A61C 19/066* (2013.01)

(58) Field of Classification Search
CPC ............... A61C 17/20; A61C 19/066; A61N 2005/0606; A61N 5/0603; A61N 7/00
See application file for complete search history.

(56) References Cited

U.S. PATENT DOCUMENTS

| | | | |
|---|---|---|---|
| 6,497,575 B2 | 12/2002 | Zavitsanos et al. | |
| 7,581,864 B2 | 9/2009 | Craig | |
| 7,604,630 B2 | 10/2009 | Jun | |
| 8,075,875 B2 | 12/2011 | Piergallini et al. | |
| 8,252,033 B2 | 8/2012 | Tucker et al. | |
| 8,371,853 B2 | 2/2013 | Levine | |
| 8,574,177 B2 | 11/2013 | Pryor et al. | |
| 8,591,227 B2 | 11/2013 | Levine | |
| 2003/0036037 A1 | 2/2003 | Zavitsanos et al. | |
| 2003/0157456 A1* | 8/2003 | Plocharczyk | A61C 19/004 433/29 |

(Continued)

FOREIGN PATENT DOCUMENTS

| | | |
|---|---|---|
| CA | 2319890 A1 | 3/2001 |
| CN | 101115527 A | 1/2008 |

(Continued)

OTHER PUBLICATIONS

Translation of KO 10-12341010 retreived from http://engpat.kipris.or.kr/engpat/biblioa.do?method=biblioFrame (Year: 2013).*

(Continued)

*Primary Examiner* — Heidi M Eide
(74) *Attorney, Agent, or Firm* — Dovas Law, P.C.

(57) ABSTRACT

A teeth whitening apparatus includes a first ultrasound generator directed to emit in a first direction into a particular area, a second ultrasound generator spaced from the first ultrasound generator on a first side of the first ultrasound generator and directed to emit in a second direction angled toward the first direction into the particular area, and a third ultrasound generator spaced from the first ultrasound generator and the second ultrasound generator on a second side of first ultrasound generator and directed to emit in a third direction angled toward the first direction and the second direction into the particular area. One or more light emitting devices are spaced from the first ultrasound generator, the second ultrasound generator, and the third ultrasound generator, and directed to emit into the particular area.

25 Claims, 9 Drawing Sheets

(56) References Cited

U.S. PATENT DOCUMENTS

| | | | |
|---|---|---|---|
| 2003/0198605 A1 | 10/2003 | Montgomery | |
| 2004/0138082 A1 | 7/2004 | Sugihara et al. | |
| 2005/0064370 A1* | 3/2005 | Duret | A61C 19/066 433/215 |
| 2005/0074723 A1 | 4/2005 | Ostler et al. | |
| 2005/0137656 A1* | 6/2005 | Malak | A61N 5/0616 607/88 |
| 2005/0196725 A1* | 9/2005 | Fu | A61C 17/0211 433/216 |
| 2005/0244792 A1 | 11/2005 | Verdi et al. | |
| 2005/0282102 A1 | 12/2005 | Kert | |
| 2007/0015112 A1* | 1/2007 | Hochman | A61B 8/546 433/215 |
| 2009/0142724 A1* | 6/2009 | Rosenblood | A61B 1/0646 433/29 |
| 2011/0076636 A1 | 3/2011 | Wolff et al. | |
| 2011/0184499 A1 | 7/2011 | Radi | |
| 2012/0029394 A1* | 2/2012 | Babaev | A61B 18/203 601/2 |
| 2014/0113244 A1* | 4/2014 | Shiba | A61K 8/22 433/29 |
| 2017/0197090 A1 | 7/2017 | Newman et al. | |

FOREIGN PATENT DOCUMENTS

| | | |
|---|---|---|
| CN | 101959466 B | 12/2014 |
| CN | 104334116 B | 3/2016 |
| CN | 105228696 B | 4/2018 |
| CN | 201821006935 U | 6/2018 |
| CN | 2009004300 U | 6/2019 |
| JP | 3030380 B2 | 4/2000 |
| JP | 2006521875 A | 9/2006 |
| JP | 2009039455 A | 2/2009 |
| JP | 4559684 B | 10/2010 |
| JP | 2014526317 A | 10/2014 |
| JP | 5932653 B2 | 6/2016 |
| JP | 6061342 B2 | 1/2017 |
| KR | 10-1234101 A | 2/2013 |
| KR | 102013-0119795 | 11/2013 |
| KR | 101651244 B1 | 8/2016 |
| WO | WO2006041432 A2 | 4/2006 |

OTHER PUBLICATIONS

Ultrasoud retreived from https://en.wikipedia.org/wiki/Ultrasound (Year: 2020).*

Ozdemir et al., " Effects of Ultrasound Homogenisation on the Activities of Superoxide Dismutase, Glutathione Peroxidase, Catalase and Levels of Lipid Peroxide in Liver Homogenates", Education and Training Hospital, Selcuk Veterinary Faculty, Department of Biochemistry, Konya, Mustafa Kemal University, Veterinary Faculty, Department of Biochemistry, Oct. 30, 2014, pp. 16-19. University, Veterinary Faculty, Department of Biochemistry, Oct. 30, 2014, pp. 16-19.

Young-Jin Lee et al., "Development of a Piezoelectric Ultrasonic Tooth-whitening Apparatus", Transactions on and Electronic Materials, 2013, 14(5), pp. 268-272. Electrical Materials, 2013, 14(5), pp. 268-272.

D'Arce MB et al., "Evaluation of Ultrasound and Light Sources as Bleaching Catalysts—An In Vitro Study", https://www.ncbi.nlm.nih.gov/pubmed/22645732, 2012 Summer; 7(2):176-84.

Baroudi et al., "The Effect of Light-Activation Sources on Tooth Bleaching", Nigerian Medical Journal, Sep.-Oct. 2014, pp. 363-368.

Huang Zhuolie et al., "Study on the Effect of Ultrasound on the Activities of Catalase and Polyphenol Oxidase from Yeasts", China Academic Journal, Apr. 2003.

Schmidt et al., "Effects of Ultrasound on the Catalytic Activity of Matrix-Bound Glucoamylase", Institute for Applied Physics, Bern Medicine, Martin Luther University Halle, Stasse The DSF 81, Halle / Saale GDR 4014 GDR, Jun. 13, 1986, pp. 295-299.

http://home.beyonddent.com/products/polus-advanced-whitening-accelerator/, accessed Jul. 17, 2018.

Beyond International, Inc. (2016-2017). Beyond International Showcase (Brochure). Oct. 2015.

Beyond International, Inc. Polus Advanced (Fold-out Brochure). Oct. 2015.

Beyond International, Inc. Polus Advanced (Brochure). Oct. 2015.

International Search Report dated Oct. 15, 2019 for PCTUS1942008.

Bernardon JK, Sartori N, Ballarin A, Perdigão J, Lopes GC, Baratieri LN. Clinical performance of vital bleaching techniques. Oper Dent. 2010;35(1)pp. 3-10.

Beyond International, Inc. "Beyond International Inc. Secures Award for Award for Eight Consecutive Years", accessed Sep. 18, 2019.

* cited by examiner

TEETH WHITENING APPARATUS

BACKGROUND

With the growing desire for whiter teeth and the revolution of aesthetic treatment methods, teeth bleaching has become a popular procedure in recent years. Tooth whiteners including hydrogen peroxide as the main component have been widely accepted in both in-office and at-home tooth bleaching products. Conventional ways for the activation of hydrogen peroxide include heat, light, chemicals and their combinations. However, the application of heat has been discouraged owing to its potential to cause external root resorption. Currently, tooth whitening using light irradiation is mainly being commercialized. Various light sources have been used as a common approach to dissociate hydrogen peroxide during in-office bleaching treatments, such as halogen, plasma arc, light emitting diode (LEDs) and laser light sources. Ultrasonic devices have been used in endodontics to activate irrigating solutions.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A teeth whitening apparatus is provided. The apparatus includes a first ultrasound generator directed to emit in a first direction into a particular area, a second ultrasound generator spaced from the first ultrasound generator on a first side of the first ultrasound generator and directed to emit in a second direction angled toward the first direction into the particular area, and a third ultrasound generator spaced from the first ultrasound generator and the second ultrasound generator on a second side of first ultrasound generator and directed to emit in a third direction angled toward the first direction and the second direction into the particular area. One or more light emitting devices are spaced from the first ultrasound generator, the second ultrasound generator, and the third ultrasound generator, and directed to emit into the particular area.

Also provided is a teeth whitening method. The teeth whitening method includes applying a dental whitening composition to teeth of a mouth. Light is emitted from a teeth whitening apparatus onto the teeth and the teeth whitening composition, and ultrasound is emitted toward the teeth at a plurality of angles from a plurality of sources of the teeth whitening apparatus.

Further provided is a system for teeth whitening. The system includes a teeth whitening composition including a peroxide composition and a catalyst. The system further includes a teeth whitening apparatus. The teeth whitening apparatus includes a first ultrasound generator, a second ultrasound generator, and a third ultrasound generator having a center frequency between 20 and 80 kHz, and one or more light emitting devices spaced from the first ultrasound generator, the second ultrasound generator, and the third ultrasound generator.

BRIEF DESCRIPTION OF THE DRAWING(S)

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein.

DETAILED DESCRIPTION OF ILLUSTRATIVE EMBODIMENT(S)

Figure 1:
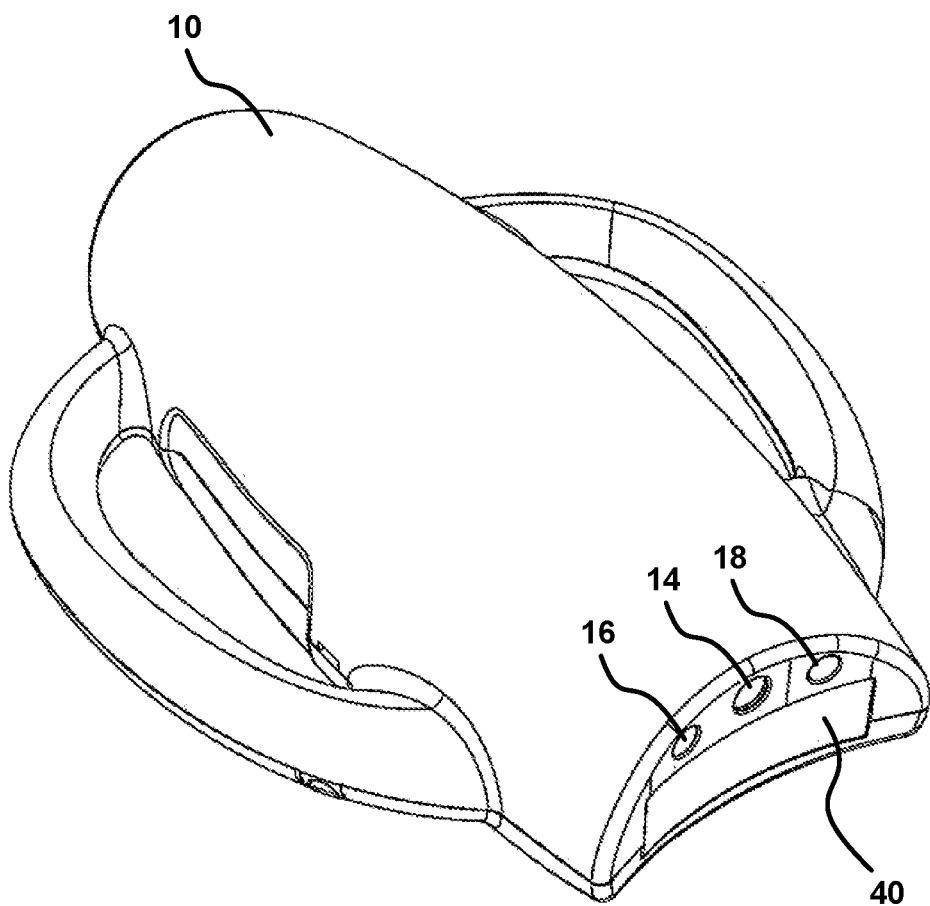
FIG. 1 is a prospective view of a teeth whitening apparatus shown with venting apertures omitted.
Figure 2:
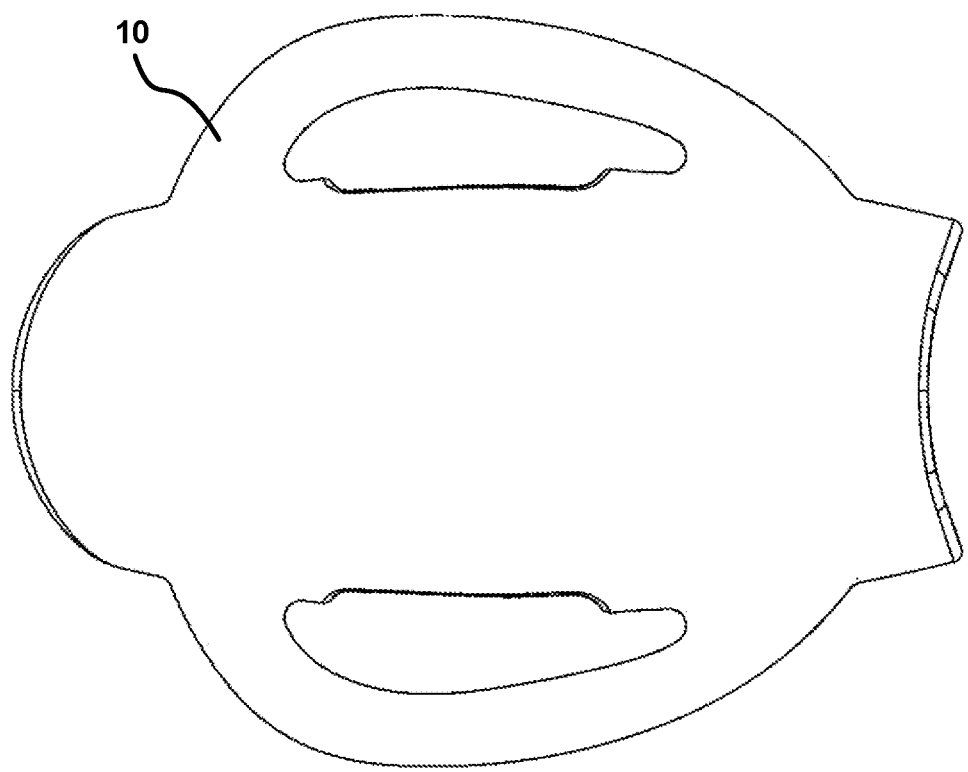
FIG. 2 is a top plan view of the teeth whitening apparatus shown with venting apertures omitted.
Figure 3:
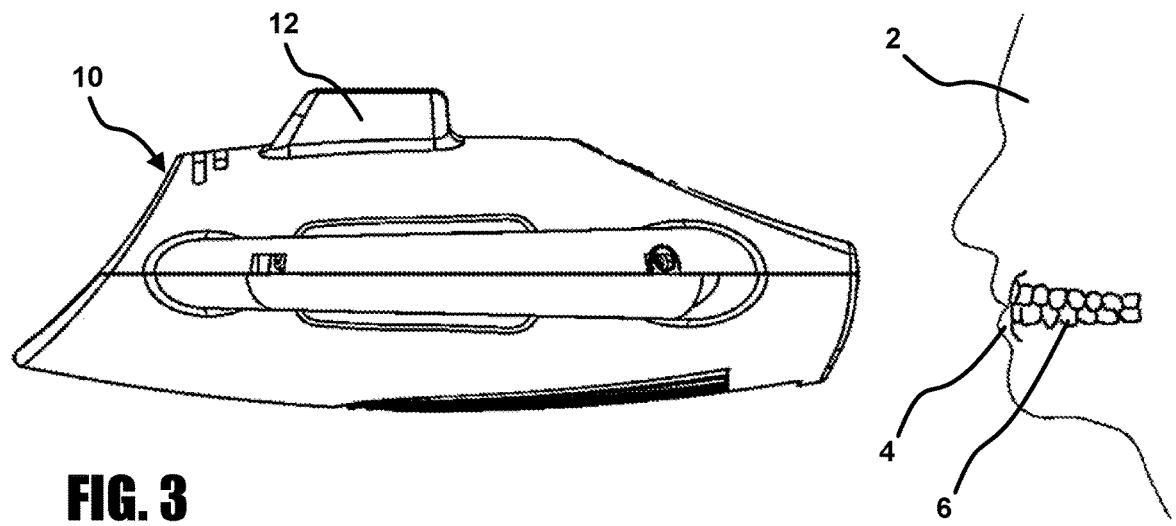
FIG. 3 is a side elevation view of the teeth whitening apparatus of FIG. 1 shown in relation to a patient positioned for treatment by the teeth whitening apparatus.

Illustrative embodiments are described below with reference to the drawing figures wherein like numerals represent like elements throughout. The terms "a" and "an" as used herein do not denote a limitation of quantity, but rather denote the presence of at least one of the referenced items. Any directional signal such as top, bottom, left, right, upper and lower are taken with reference to the orientation in the various figures.

Referring to FIGS. 1 through 8, a teeth whitening apparatus (hereinafter "apparatus") 10 is shown according to an illustrative embodiment. The apparatus 10 includes mounting structure 12 for connection to a suitable appendage for positioning the apparatus in proximity to a mouth of a user, for example the mouth 4 of the patient 2. The apparatus 10 includes a first ultrasound generator 14 directed to emit ultrasound signals 14A in a first direction 14B, a second ultrasound generator 16 directed to emit ultrasound 16A in a second direction 16B angled toward the first direction 14B, and a third ultrasound generator 18 directed to emit ultrasound 18A in a third direction 18B angled toward the first direction 14B and the second direction 16B. The first, second, and third ultrasound generators 14, 16, 18 are disposed along a concave surface 20 of the apparatus 10. The ultrasound generators 14, 16, 18 align providing full mouth coverage and accelerating the release of active oxygen from a teeth whitening composition applied to teeth 6 during a teeth whitening treatment, which in turn reduces treatment duration and improves patient comfort during the teeth whitening treatment.

Figure 9A:
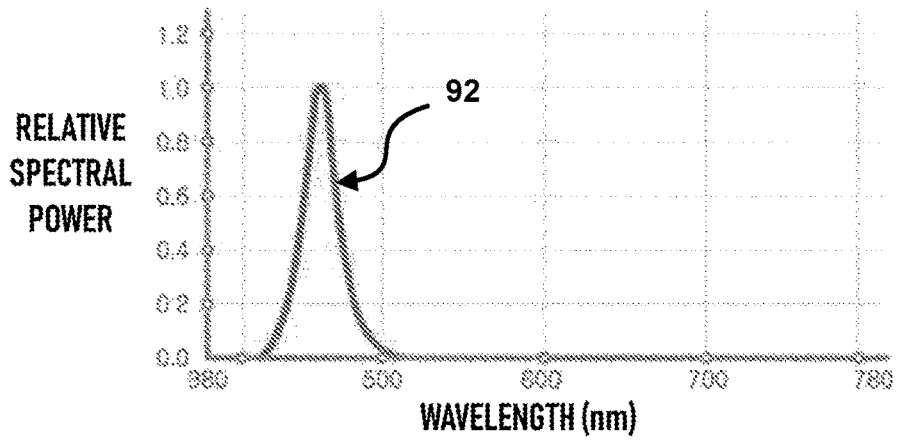
FIGS. 9A-9C are charts showing spectral power distribution of a light emitting diode ("LED") array and halogen lamp of the teeth whitening apparatus of FIG. 1.
Figure 9B:
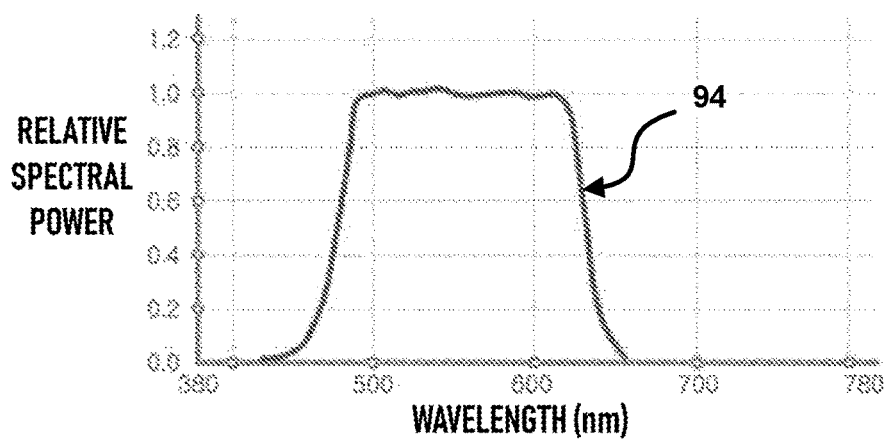

A halogen lamp 22 directs light through thermal lens 24, filter lens 26, and a plurality of optical fibers 30 to a first array of outputs 32 arranged in an elongated row and a second array of outputs 34 arranged in an elongated row spaced from the elongated row of the first array of outputs 32, the outputs 32, 34 including ends of the optical fibers 30. Beneficially, a total of about 200,000 optical fibers direct light from the halogen lamp 22 to a total of about 100,000 outputs 32 and 100,000 outputs 34. The halogen lamp 22 is a reflector lamp cup type beneficially a having maximum power rating of 100 watts at 12V and a color temperature of 3000K. The halogen lamp 22 is drivable by apparatus processor controls in a low mode, a medium mode, and a high mode, corresponding to illuminance of 170,000 lux, 220,000 lux, and 290,000 lux respectively. Beneficially, the halogen lamp 22 has a peak wavelength between 300 nm and 750 nm. More beneficially, the halogen lamp 22 has a peak wavelength between 400 nm and 650 nm. Referring to FIG. 9B, a curve 94 shows an exemplary relative spectral power of the halogen lamp 22 relative to wavelength in nanometers.

An array of light emitting diodes ("LEDs") 36 are positioned between the first array of outputs 32 and the second array of outputs 34 of the plurality of optical fibers 30. The array of LEDs 36 beneficially has a power of about 12 watts at a voltage of about 9V to 10V. The array of LEDs 36 is drivable by apparatus processor controls in a low mode, a medium mode, and a high mode, corresponding to illuminance of 5000 lux, 7000 lux, and 9000 lux respectively. Beneficially, the array of LEDs has a peak wavelength between 400 nm and 525 nm. More beneficially, the array of LEDs 36 has a peak wavelength between 450 nm and 475 nm. Even more beneficially, the array of LEDs 36 has a peak wavelength between 460 nm and 465 nm. A transparent film sheet 40 is provided to protect the outputs 32, 32 and the array of LEDs 36. Referring to FIG. 9A, a curve 92 shows an exemplary relative spectral power of the array of LEDs 36 relative to wavelength in nanometers.

Figure 7:
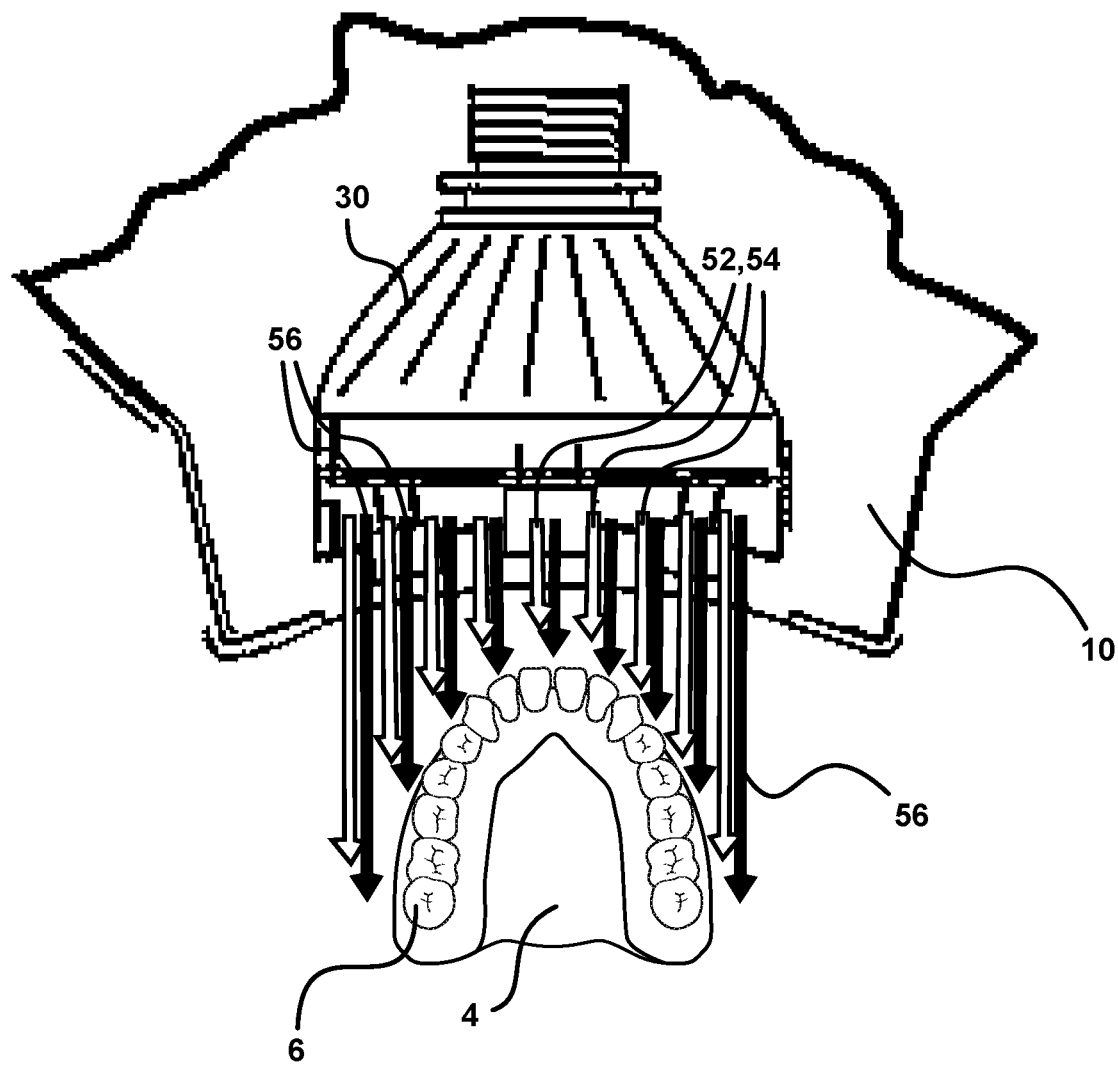
FIG. 7 is a top plan view of a front portion of the teeth whitening apparatus of FIG. 1 with particular internal components exposed showing light directed toward teeth of the mouth.
Figure 8:
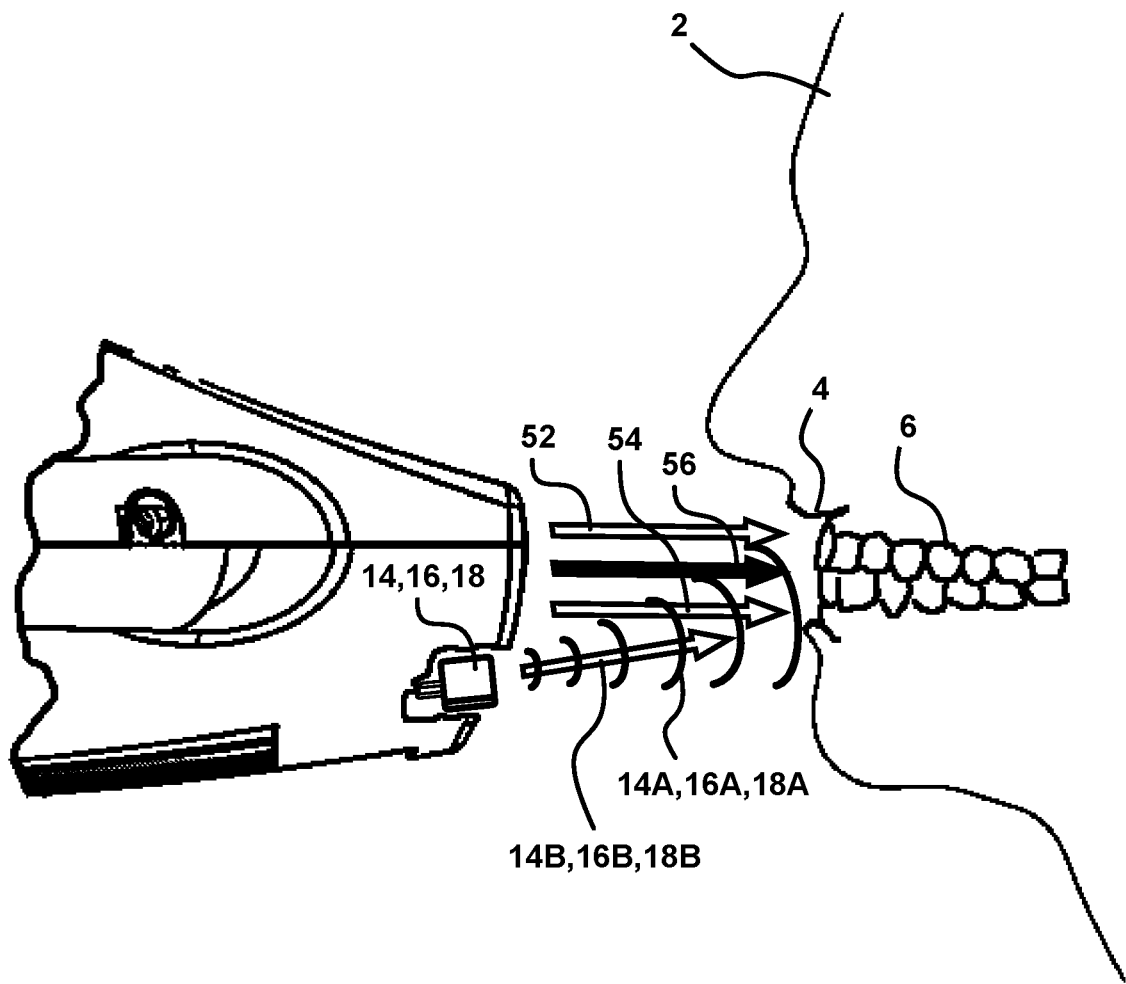
FIG. 8 is a front elevation view of the teeth whitening apparatus of FIG. 1 with a cutaway showing ultrasound generators and showing ultrasound and light directed toward teeth of the mouth.
Figure 9C:
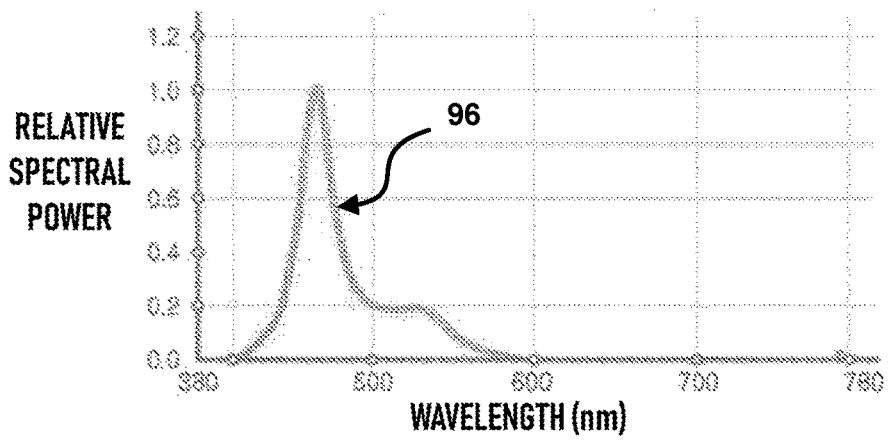

Referring to FIGS. 7 and 8, the first array of outputs 32 of the optical fibers 30 emit in a direction 52, the second array of outputs 34 of the optical fibers 30 emit in a direction 54, and the array of LEDs 36 emit in a direction 56. The light emissions in the directions 52, 54, 56 define three parallel planes which are perpendicular to the view of FIG. 8 and coplanar with the view of FIG. 7. Referring to FIG. 9C, a curve 96 shows an exemplary relative spectral power of the combination of the array of LEDs 36 and the halogen lamp 22 relative to wavelength in nanometers. The array of LEDs 36 and halogen lamp 22 light sources are adjustable by apparatus processor controls in different illuminance modes to allow a practitioner to adjust the illuminance according to different treatment conditions.

Figure 4:
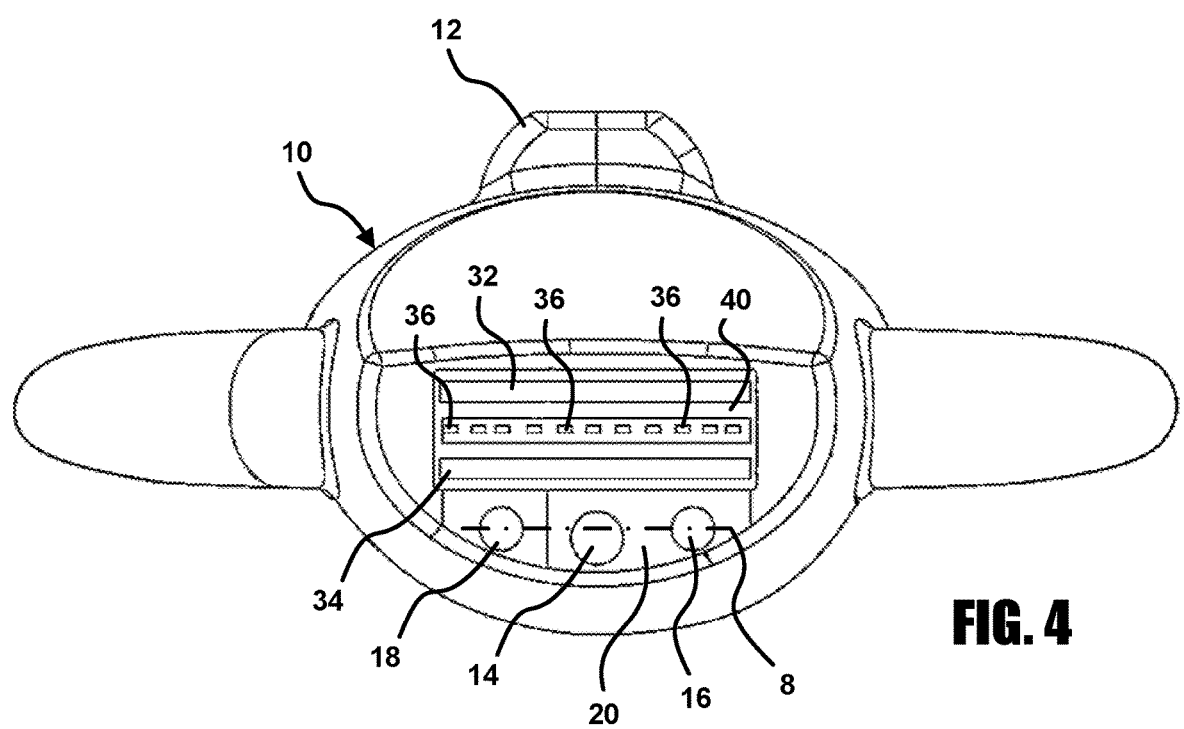
FIG. 4 is a front elevation view of the teeth whitening apparatus of FIG. 1.
Figure 5:
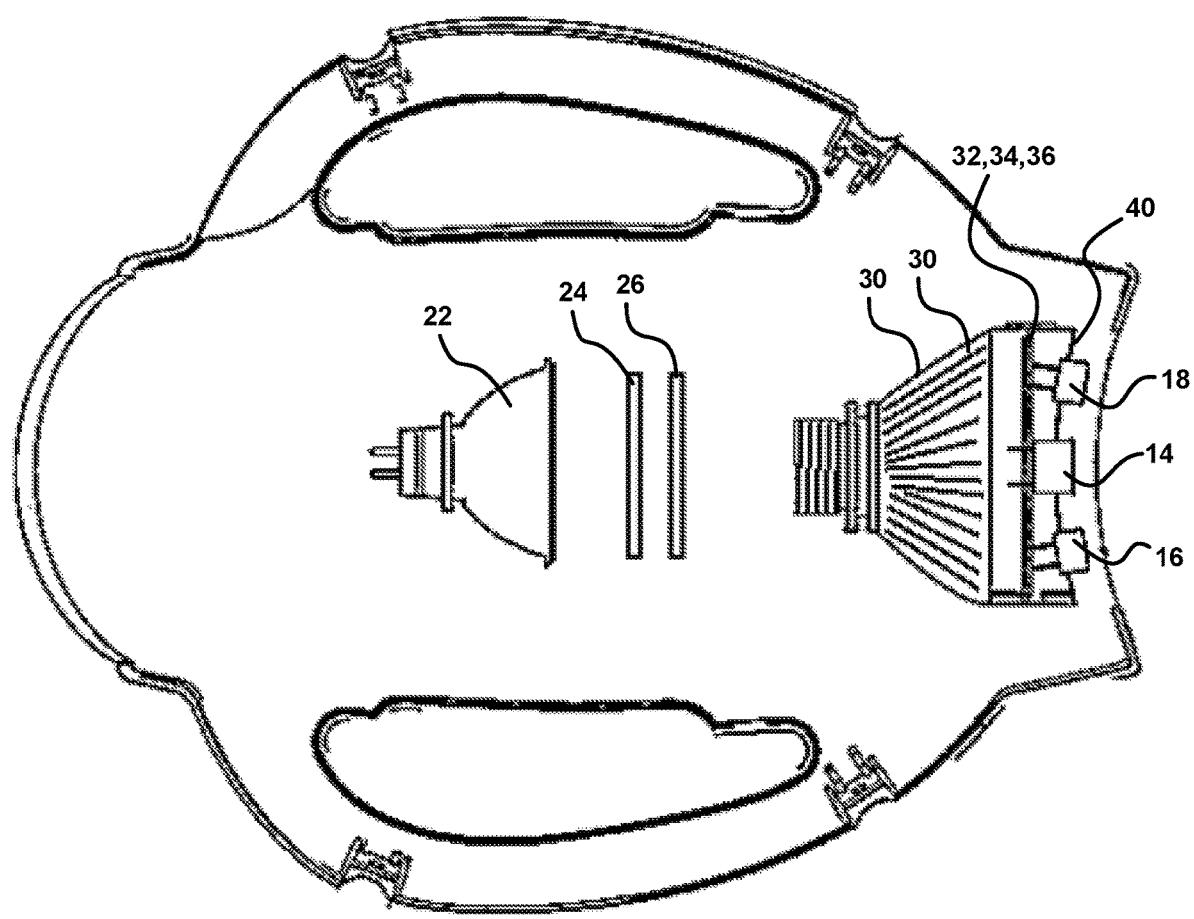
FIG. 5 is a top plan view of the teeth whitening apparatus of FIG. 1 with particular internal components exposed by removal of a cover of the apparatus.

The first ultrasound generator 14, the second ultrasound generator 16, and the third ultrasound generator 18 are disposed along a curved path defined by the concave surface 20 of the apparatus 10 substantially aligned in a plane represented by line 8 in FIG. 4. Referring to FIG. 8, the first ultrasound generator 14, the second ultrasound generator 16, and the third ultrasound generator 18 are angled toward the first array of outputs 32, the second array of outputs 34, and the array of LEDs 36. The ultrasound generators 14, 16, 18 emit the ultrasound signals 14A, 16A, 18A in the directions 14B, 16B, 18B which are angled toward and pass through the planes defined by the directions 52, 54, 56 of the light emissions, whereby the first ultrasound generator 14, the second ultrasound generator 16, and the third ultrasound generator 18 are directed to emit through the planes.

The ultrasound generators 14, 16, 18 beneficially have a center frequency between 10 kHz and 500 kHz, and more beneficially between 20 kHz and 80 kHz. Ultrasound between 10 kHz and 500 kHz has been found to increase the activities of catalase, a common enzyme found in living organisms. Even more beneficially, the ultrasound generators 14, 16, 18 have a center frequency between 35 kHz and 45 kHz. Even more beneficially, the ultrasound generators 14, 16, 18 have a center frequency of about 40 kHz. The ultrasound generators 14, 16, 18 are beneficially provided as open integrally transmitting and receiving ultrasonic sensors. The first ultrasound generator 14 for example has a diameter of 12 mm and the second ultrasound generator 16 and the third ultrasound generator 18 for example have a diameter of 10 mm.

Figure 10:
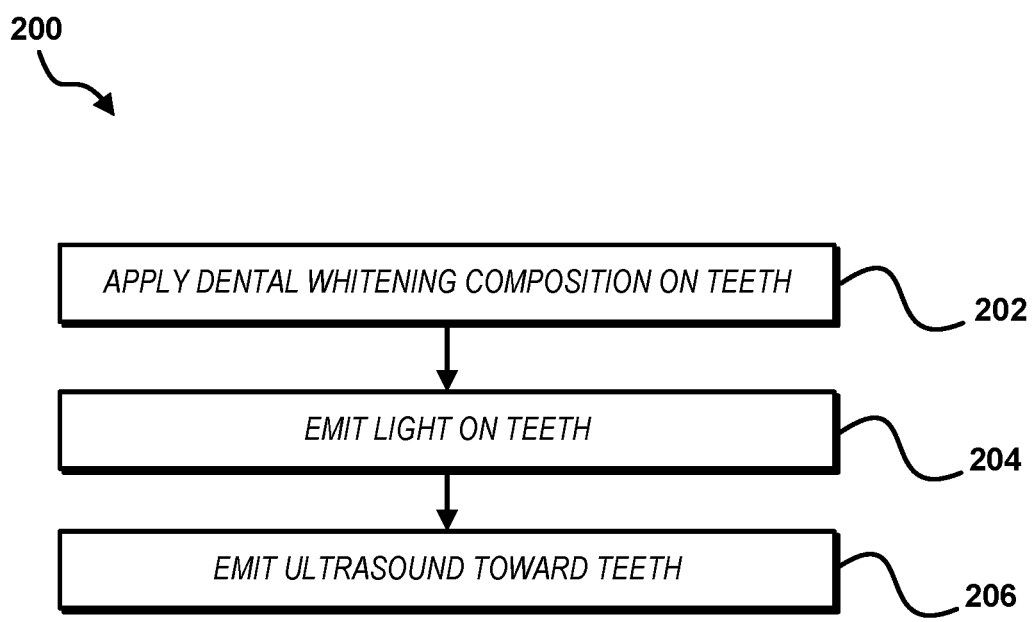
FIG. 10 is a flow chart showing a teeth whitening method.

Referring to FIG. 10, a flowchart shows a teeth whitening method 200. While the method 200 and associated processes are described with reference to the components shown in FIGS. 1-8, including the teeth whitening apparatus 10 and constituent elements, the method 200 may alternatively be performed via other suitable devices and systems.

In a step 202, a dental whitening composition, also known as a "bleaching" composition, is prepared and applied to teeth 6 of a mouth 4. The dental whitening composition is beneficially a peroxide compound in a colloid gel including 3% to 45% hydrogen peroxide, more beneficially 30% to 40% hydrogen peroxide. Even more beneficially, the dental whitening composition is a two part gel including about 35% hydrogen peroxide in a first part and a catalyst including catalase in the second part, the two parts for example provided in a double barrel self-mixing syringe. Prior to application of the whitening composition, beneficially a cheek retractor is installed on the mouth 4 to facilitate access to the teeth 6, and the soft tissues of the gums of the teeth 6 are protected with a gingival barrier, for example a semi-fluid gingival barrier applied by syringe.

Figure 6:
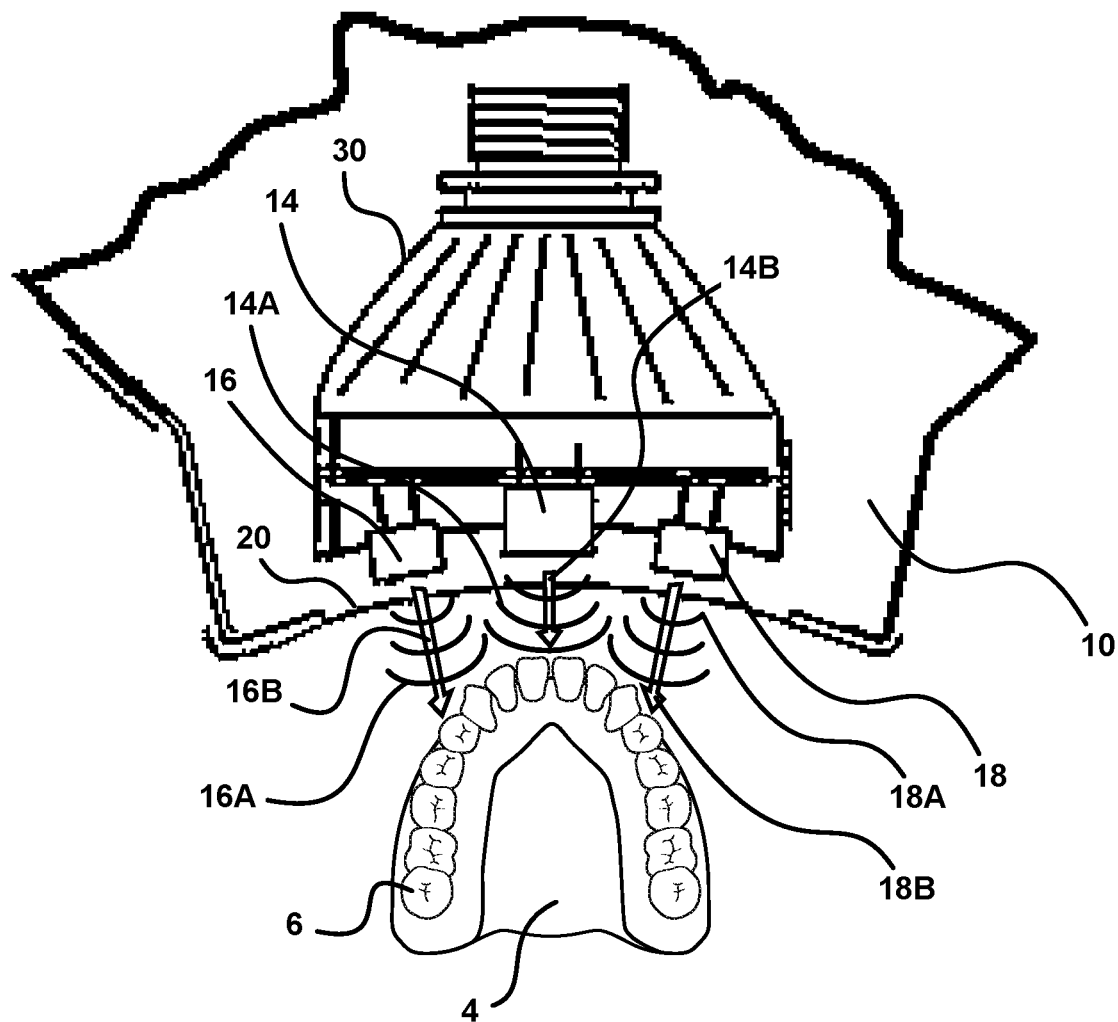
FIG. 6 is a top plan view of a front portion of the teeth whitening apparatus of FIG. 1 with particular internal components exposed showing ultrasound directed toward teeth of a mouth.

Light is emitted from a teeth whitening apparatus onto the teeth 6 and onto the teeth whitening composition (step 204), for example the apparatus 10 emitting light from the halogen lamp 22 and the array of LEDs 36. Ultrasound is emitted toward the teeth at a plurality of angles from a plurality of sources of the teeth whitening apparatus (step 206), for example by the first ultrasound generator 14, the second ultrasound generator 16, and the third ultrasound generator 18 of the apparatus 10. Steps 204 and 206 are beneficially performed simultaneously such that light and ultrasound are emitted at the same time. As shown in FIG. 6, the first ultrasound generator 14 is directed to emit in a first direction 14B toward a front of the mouth 4 toward the teeth 6, the second ultrasound generator 16 is spaced from the first ultrasound generator 14 on a first side of the first ultrasound generator 14 and directed to emit in a second direction 16B angled toward the first direction 14B toward a first side of the mouth 4 toward the teeth 6, and the third ultrasound generator 18 is spaced from the first ultrasound generator 14 and the second ultrasound generator 16 on a second side of first ultrasound generator 14 and directed to emit in a third direction 18B angled toward the first direction 14B and the second direction 16B toward a second side of the mouth toward the teeth 6.

The emitted light and ultrasound activates or accelerates activation of the teeth whitening composition. The hydrogen peroxide of the teeth whitening composition is activated by light and heat releasing active oxygen or hydroxyl radicals that can crack unsaturated double bonds of long, colored molecules on the teeth to achieve a bleaching effect. Ultrasonic energy accelerates the decomposition of the hydrogen peroxide or other peroxide composition (e.g., carbamide peroxide), accelerating the release of oxygen ions from the peroxide composition, which in turn increases the reaction rate and enhances the whitening of the teeth. Ultrasound also accelerates the diffusion of hydrogen peroxide into dental enamel to enhance whitening, wherein activated oxygen released accelerates diffusion of oxygen ions into the dental enamel. Ultrasound further increases activity of the activation catalyst, for example catalase enzyme, accelerating the decomposition of hydrogen peroxide.

EXAMPLES

Example 1

In a first example test application of the teeth whitening apparatus 10, fifty-four (54) enamel disks 5×7 mm in diameter and 1.0 mm in thickness were prepared from bovine incisors sterilized with ethylene oxide. Half of the enamel disks were immersed in warm coffee solution (55° C.) for 24 hours, washed for 30s and stored in distilled water to create discolored enamel specimens, which were then divided into three (3) groups and subjected to whitening treatments with 35% $H_2O_2$ gel alone (GEL), 35% $H_2O_2$+ 480-520 nm blue light (GEL/LT), and 35% $H_2O_2$+blue light+40 KHz ultrasound (GEL/LT/US), respectively, using an example of the apparatus 10 for application of blue light and ultrasound. Whitening efficacies were measured with a spectrophotometer (Olympus CrystalEye™) in CIE Lab color space at 5, 15, 30, 45 and 60 minutes. The remaining twenty-seven (27) enamel disks were divided into three (3) groups and mounted on an artificial pulp chamber sealed with wax in the peripheral, and placed in 12-well sterile cells containing a 1.0 ml acetate buffer. To assess $H_2O_2$ diffusion, exposed enamel surfaces were treated with GEL, GEL/LT and GEL/LT/US as above, and an aliquot of 50 µl acetate buffer was collected at 5, 10, 15, 30, 45 and 60 minutes, respectively, to calculate the $H_2O_2$ concentration (µg/ml) in each treatment group using a leucocrystal violet/horseradish peroxidase assay. CIE Lab color changes (ΔE) and $H_2O_2$ diffusion were compared among the three (3) groups using ANOVA and post hoc PLSD tests.

There were no significant differences in ΔE at 5 minutes among the three groups, but ΔE were statistically significant higher in GEL/LT and GEL/LT/US than in GEL at 15 minutes, and higher in GEL/LT/US than in GEL and GEL/LT at 30, 45 and 60 minutes. It took 30 minutes for ΔE to reach 17.5 in GEL/LT/US, an equivalent of ten (10) shades change (from A4 to A2), as compared to 60 minutes in GEL/LT group (Table 1). Diffusion of peroxide through enamel was significantly higher in GEL/LT/US than in GEL and GEL/LT at 5 and 10 minutes. GEL/LT and GEL/LT/US showed significantly higher diffusion of peroxide than in GEL throughout the experimental period (Table 2). Addition of ultrasound enhanced efficacy of light-assisted tooth whitening and accelerated diffusion of $H_2O_2$ through dental enamel in vitro.

TABLE 1

ΔE at different treatment durations in the three comparison groups*

| GROUP | 5 min | 15 min | 30 min | 45 min | 60 min |
|---|---|---|---|---|---|
| GEL | 3.8 ± 3.1a | 7.3 ± 2.8b | 9.3 ± 3.2d | 11.5 ± 4.3de | 13.2 ± 4.0f |
| GEL/LT | 4.7 ± 1.6a | 9.2 ± 1.4c | 11.6 ± 2.3d | 13.7 ± 3.3e | 17.5 ± 4.5f |
| GEL/LT/US | 4.4 ± 2.7a | 11.8 ± 4.0c | 17.6 ± 6.5e | 21.3 ± 8.0f | 23.5 ± 8.7g |

*ANOVA: different letters in the same column denote statistically significant differences ($p < 0.05$)

TABLE 2

Concentrations of peroxide (µg/ml) diffused through enamel disks (1.0 mm) at different treatment durations in the three comparison groups*

| Group | 5 min | 10 min | 15 min | 30 min | 45 min | 60 min |
|---|---|---|---|---|---|---|
| GEL | 0.3 ± 0.1a | 0.9 ± 0.5b | 1.2 ± 0.5e | 4.6 ± 0.9g | 6.6 ± 0.9j | 8.6 ± 0.5m |
| GEL/LT | 1.4 ± 0.6b | 2.2 ± 1.2c | 5.4 ± 1.2f | 6.8 ± 0.9h | 9.3 ± 0.8k | 10.2 ± 0.7n |
| GEL/LT/US | 3.2 ± 0.6c | 4.6 ± 1.1d | 5.5 ± 1.0f | 6.9 ± 0.5h | 9.4 ± 0.6k | 10.2 ± 0.6n |

*ANOVA: different letters in the same column denote statistically significant differences ($p < 0.05$)

Example 2

Figure 11A:
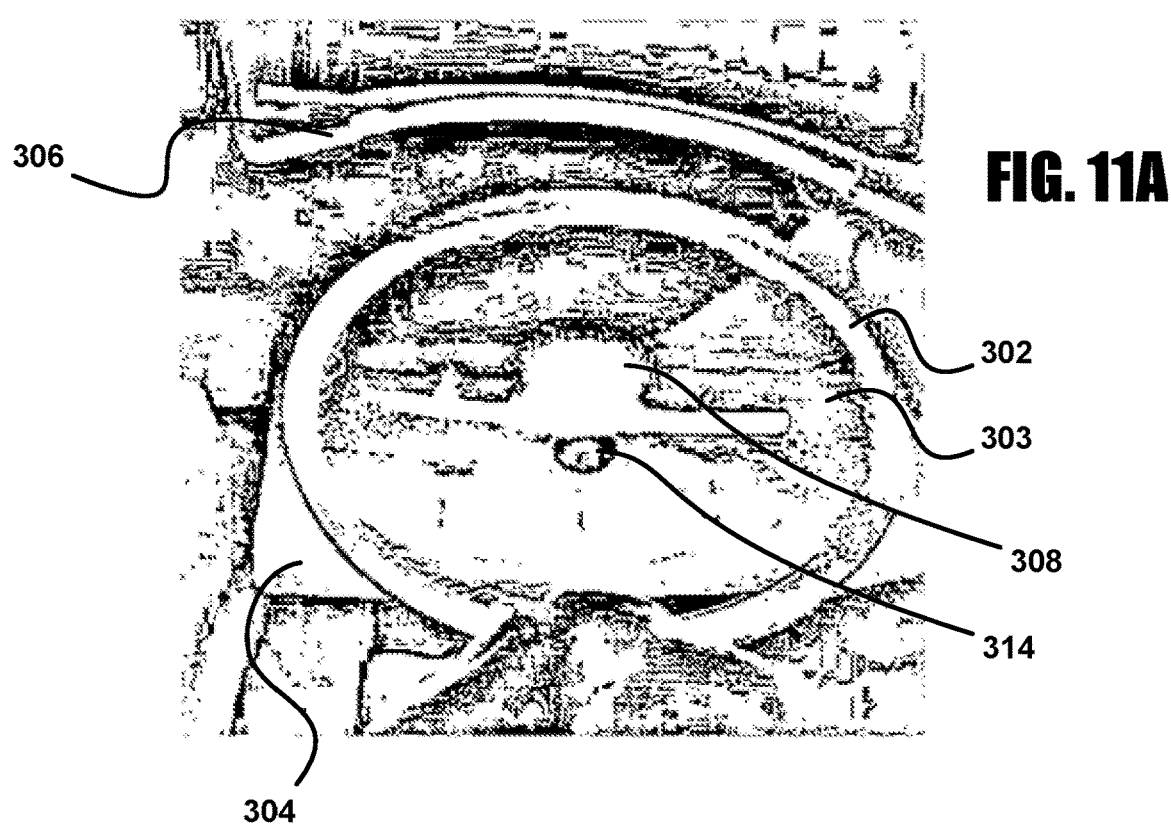
FIG. 11A is rendering of a photograph of first test setup for visualizing effects of a single ultrasound generator.

Referring to FIG. 11A, in a first test setup, a single ultrasound generator 314 of the type described above was arranged on a first test platform 304. A ring 302 was dipped in a soap, water, and glycerin solution to create a bubble film 303 on the ring 302. The bubble film 303 was illuminated by a lighting apparatus 306 and a disturbance 308 was visible on the bubble film 303 demonstrating the unidirectional nature of ultrasound propagation.

Figure 11B:
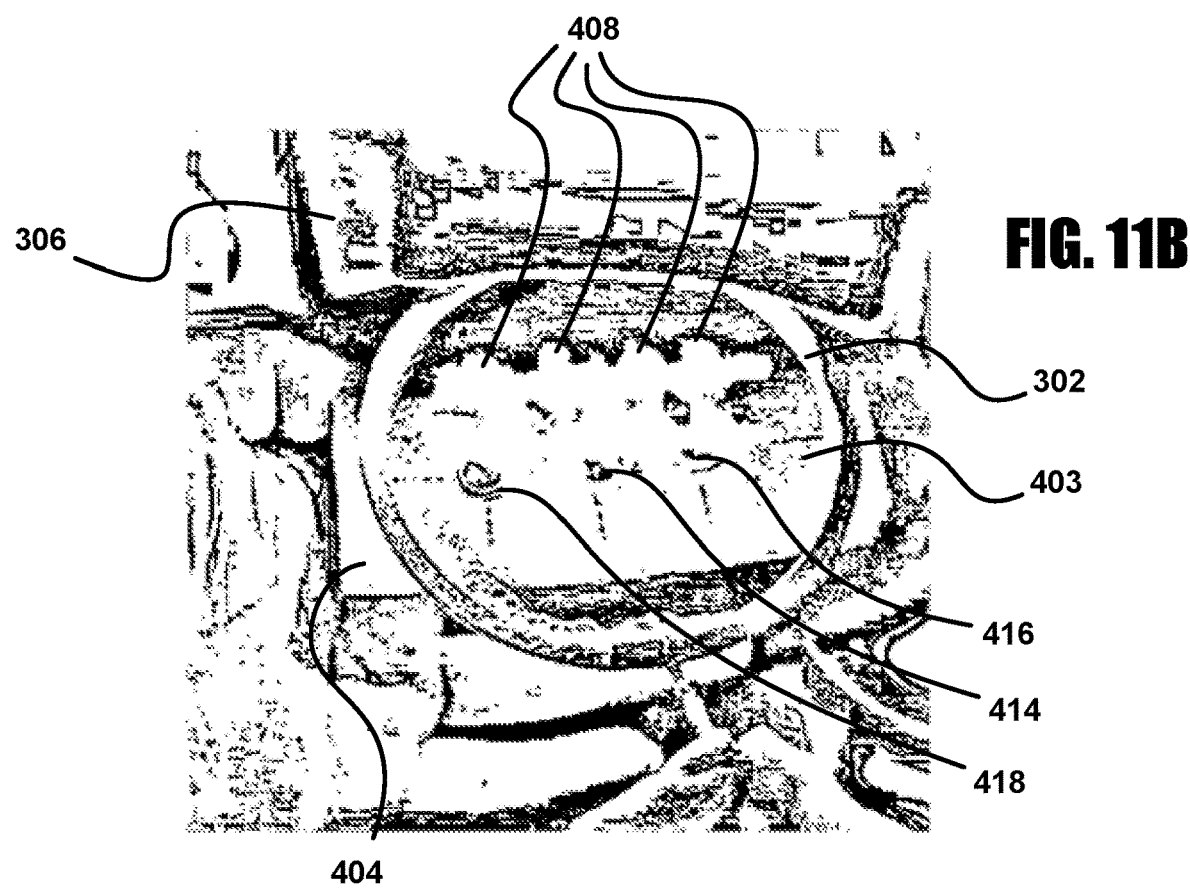
FIG. 11B is a rendering of a photograph of a second test setup for visualizing effects of three ultrasound generators.

Referring to FIG. 11B, in a second test setup, three ultrasound generators 414, 416, 418 of the type described above were arranged on a second test platform 404 approximating the arrangement of ultrasound generators 14, 16, 18 shown in FIGS. 4-8. The ring 302 was dipped in the soap, water, and glycerin solution to create a bubble film 403 on the ring 302. The bubble film 403 was illuminated by the lighting apparatus 306 and a plurality of distributed disturbances 408 were visible on the bubble film 403 evidencing the comprehensive coverage and beneficial distribution associated with the arrangement of the ultrasound generators 414, 416, 418 as compared to the arrangement of FIG. 11A.

Since ultrasound is a mechanical wave in a longitudinal direction, it can be focused and transmitted in a straight line. Due to the unidirectional ultrasound propagation effect, providing multiple ultrasound generators targeting the entire arch of the mouth provides beneficial results as evidenced by the second test setup as compared to the first test setup. The teeth whitening apparatus 10 of FIGS. 1-8 with the three ultrasound generators 14, 16, 18 provides more comprehensive coverage on the entire mouth as compared to a system implementing a single ultrasound generator. This enables reduced treatment duration and improved whitening outcomes, ultimately improving patient comfort and satisfaction.

Although features and elements are described above in particular combinations, one of ordinary skill in the art will appreciate that each feature or element can be used alone or in any combination with the other features and elements. While embodiments have been described in detail above, these embodiments are non-limiting and should be considered as merely exemplary. Modifications and extensions may be developed, and all such modifications are deemed to be within the scope defined by the appended claims.

What is claimed is:

1. A teeth whitening apparatus comprising:
   a first ultrasound generator directed to emit sound in a first direction into a particular area;
   a second ultrasound generator spaced from the first ultrasound generator on a first side of the first ultrasound generator and directed to emit sound in a second direction angled toward the first direction into the particular area;
   a third ultrasound generator spaced from the first ultrasound generator and the second ultrasound generator on a second side of first ultrasound generator and directed to emit sound in a third direction angled toward the first direction and the second direction into the particular area; and
   a plurality of light emitting devices spaced from the first ultrasound generator, the second ultrasound generator, and the third ultrasound generator and directed to emit light into the particular area, the plurality of light emitting devices comprising:
      a first plurality of optical fibers arranged to direct light to a first plurality of outputs arranged in a first elongated row which emit light in a first plane;
      a second plurality of optical fibers arranged to direct light to a second plurality of outputs arranged in a second elongated row which emit light in a second plane;
      an array of light emitting diodes ("LEDs") positioned between the first plurality of outputs and the second plurality of outputs and directed to emit light between the first plane and the second plane;
   wherein:
   the first ultrasound generator, the second ultrasound generator, and the third ultrasound generator are disposed along a curved path in a third plane parallel to the first plane and spaced from the first plane, the first plurality of outputs positioned between the curved path and the array of LEDs; and
   the first direction, the second direction, and the third direction are angled toward the first plane whereby the first ultrasound generator, the second ultrasound generator, and the third ultrasound generator are directed to emit sound through the first plane.

2. The teeth whitening apparatus of claim 1, wherein the first ultrasound generator, the second ultrasound generator, and the third ultrasound generator are disposed along a concave surface.

3. The teeth whitening apparatus of claim 1, wherein the plurality of light emitting devices further comprise a halogen lamp, the first plurality of optical fibers arranged to direct light from the halogen lamp to the first plurality of outputs.

4. The teeth whitening apparatus of claim 3, wherein the first ultrasound generator, the second ultrasound generator, and the third ultrasound generator are disposed along a concave surface.

5. The teeth whitening apparatus of claim 1, wherein the plurality of light emitting devices further comprise a lamp, the first plurality of optical fibers positioned to direct light from the lamp to the first plurality of outputs, and the second plurality of optical fibers positioned to direct light from the lamp to the second plurality of outputs.

6. The teeth whitening apparatus of claim 1, wherein:
   the second plane is parallel to the first plane and the third plane; and
   the first direction, the second direction, and the third direction are angled toward the second plane whereby the first ultrasound generator, the second ultrasound generator, and the third ultrasound generator are directed to emit sound through the second plane.

7. The teeth whitening apparatus of claim 1, wherein the first ultrasound generator, the second ultrasound generator, and the third ultrasound generator comprise a center frequency between 10 kHz and 500 kHz.

8. The teeth whitening apparatus of claim 1, wherein the first ultrasound generator, the second ultrasound generator, and the third ultrasound generator comprise a center frequency between 20 kHz and 80 kHz.

9. The teeth whitening apparatus of claim 1, wherein the first ultrasound generator, the second ultrasound generator, and the third ultrasound generator comprise a center frequency of 40 kHz.

10. The teeth whitening apparatus of claim 1, wherein the first plurality of optical fibers emit light at a peak wavelength between 400 nm-650 nm.

11. The teeth whitening apparatus of claim 1, wherein the array of LEDs comprise a peak wavelength between 450 nm-475 nm.

12. The teeth whitening apparatus of claim 1, wherein the array of LEDs have a first peak wavelength between 450 nm-475 nm, the plurality of light emitting devices further comprising a halogen lamp having a second peak wavelength between 400 nm-650 nm, the first plurality of optical fibers arranged to direct light from the halogen lamp to the first plurality of outputs.

13. The teeth whitening apparatus of claim 1, wherein the plurality of light emitting devices further comprise a halogen lamp, the first plurality of optical fibers arranged to direct light from the halogen lamp to the first plurality of outputs, and the second plurality of optical fibers arranged to direct light from the halogen lamp to the second plurality of outputs.

14. A teeth whitening apparatus comprising:
   a first ultrasound generator directed to emit sound in a first direction into a particular area;
   a second ultrasound generator spaced from the first ultrasound generator on a first side of the first ultrasound generator and directed to emit sound in a second direction angled toward the first direction into the particular area;
   a third ultrasound generator spaced from the first ultrasound generator and the second ultrasound generator on a second side of first ultrasound generator and directed to emit sound in a third direction angled toward the first direction and the second direction into the particular area; and
   a plurality of light emitting devices spaced from the first ultrasound generator, the second ultrasound generator, and the third ultrasound generator and directed to emit light into the particular area, the plurality of light emitting devices comprising:
a first plurality of optical fibers arranged to direct light to a first plurality of outputs arranged in a first elongated row which emit light in a first plane;
a second plurality of optical fibers arranged to direct light to a second plurality of outputs arranged in a second elongated row which emit light in a second plane; and
an array of light emitting diodes ("LEDs") positioned between the first plurality of outputs and the second plurality of outputs and directed to emit light between the first plane and the second plane; wherein:
the first direction, the second direction, and the third direction are angled toward the first plane and the second plane whereby the first ultrasound generator, the second ultrasound generator, and the third ultrasound generator are directed to emit sound through the first plane and the second plane, and the first plurality of outputs are positioned between the array of LEDs on a first side of the first plurality of outputs and the first ultrasound generator, the second ultrasound generator, and the third ultrasound generator on a second side of the first plurality of outputs.

15. The teeth whitening apparatus of claim 14, wherein the plurality of light emitting devices further comprise a lamp, the first plurality of optical fibers positioned to direct light from the lamp to the first plurality of outputs, and the second plurality of optical fibers positioned to direct light from the lamp to the second plurality of outputs.

16. A teeth whitening method comprising:
providing a teeth whitening apparatus comprising:
a first ultrasound generator directed to emit sound in a first direction into a particular area;
a second ultrasound generator spaced from the first ultrasound generator on a first side of the first ultrasound generator and directed to emit sound in a second direction angled toward the first direction into the particular area;
a third ultrasound generator spaced from the first ultrasound generator and the second ultrasound generator on a second side of first ultrasound generator and directed to emit sound in a third direction angled toward the first direction and the second direction into the particular area; and
a plurality of light emitting devices spaced from the first ultrasound generator, the second ultrasound generator, and the third ultrasound generator and directed to emit light into the particular area, the plurality of light emitting devices comprising:
a first plurality of optical fibers arranged to direct light to a first plurality of outputs arranged in a first elongated row which emit light in a first plane;
a second plurality of optical fibers arranged to direct light to a second plurality of outputs arranged in a second elongated row which emit light in a second plane; and
an array of light emitting diodes ("LEDs") positioned between the first plurality of outputs and the second plurality of outputs and directed to emit light between the first plane and the second plane; wherein:
the first ultrasound generator, the second ultrasound generator, and the third ultrasound generator are disposed along a curved path in a third plane parallel to the first plane and spaced from the first plane, the first plurality of outputs positioned between the curved path and the array of LEDs; and
the first direction, the second direction, and the third direction are angled toward the first plane whereby the first ultrasound generator, the second ultrasound generator, and the third ultrasound generator are directed to emit sound through the first plane;
applying a dental whitening composition to teeth of a mouth;
emitting light from the first plurality of outputs, the second plurality of outputs, and the array of LEDs onto the teeth and the dental whitening composition from the teeth whitening apparatus; and
emitting ultrasound toward the teeth at a plurality of angles from the first ultrasound generator, the second ultrasound generator, and the third ultrasound generator.

17. The teeth whitening method of claim 16, further comprising:
the first ultrasound generator emitting toward a front of the mouth;
the second ultrasound generator emitting toward a first side of the mouth; and
the third ultrasound generator emitting toward a second side of the mouth.

18. The teeth whitening method of claim 16, wherein applying the dental whitening composition comprises applying a composition comprising between 3% and 45% hydrogen peroxide.

19. The teeth whitening method of claim 16, wherein applying the dental whitening composition comprises applying a composition comprising between 30% and 40% hydrogen peroxide.

20. The teeth whitening method of claim 16, wherein applying the dental whitening composition comprises applying a composition comprising a catalyst.

21. A system for teeth whitening comprising:
a teeth whitening composition comprising a peroxide composition and a catalyst; and
a teeth whitening apparatus comprising:
a first ultrasound generator directed to emit sound in a first direction into a particular area;
a second ultrasound generator spaced from the first ultrasound generator on a first side of the first ultrasound generator and directed to emit sound in a second direction angled toward the first direction into the particular area;
a third ultrasound generator spaced from the first ultrasound generator and the second ultrasound generator on a second side of first ultrasound generator and directed to emit sound in a third direction angled toward the first direction and the second direction into the particular area; and
a plurality of light emitting devices spaced from the first ultrasound generator, the second ultrasound generator, and the third ultrasound generator and directed to emit light into the particular area, the plurality of light emitting devices comprising:
a first plurality of optical fibers arranged to direct light to a first plurality of outputs arranged in a first elongated row which emit light in a first plane;
a second plurality of optical fibers arranged to direct light to a second plurality of outputs arranged in a second elongated row which emit light in a second plane parallel to the first plane; and an array of light emitting diodes ("LEDs") positioned between the first plurality of outputs and the second plurality of outputs and directed to emit light between the first plane and the second plane; wherein:

the first ultrasound generator, the second ultrasound generator, and the third ultrasound generator are disposed along a curved path in a third plane parallel to the first plane and spaced from the first plane, the first plurality of outputs positioned between the curved path and the array of LEDs; and the first direction, the second direction, and the third direction are angled toward the first plane whereby the first ultrasound generator, the second ultrasound generator, and the third ultrasound generator are directed to emit sound through the first plane; and the first ultrasound generator, the second ultrasound generator, and the third ultrasound generator have a center frequency between 20 kHz and 80 kHz.

22. The system for teeth whitening of claim 21, wherein the peroxide composition comprises between 3% and 45% hydrogen peroxide.

23. A teeth whitening method comprising:
providing a teeth whitening apparatus comprising:
- a first ultrasound generator directed to emit sound in a first direction into a particular area;
- a second ultrasound generator spaced from the first ultrasound generator on a first side of the first ultrasound generator and directed to emit sound in a second direction angled toward the first direction into the particular area;
- a third ultrasound generator spaced from the first ultrasound generator and the second ultrasound generator on a second side of first ultrasound generator and directed to emit sound in a third direction angled toward the first direction and the second direction into the particular area; and
- a plurality of light emitting devices spaced from the first ultrasound generator, the second ultrasound generator, and the third ultrasound generator and directed to emit light into the particular area, the plurality of light emitting devices comprising:
  - a first plurality of optical fibers arranged to direct light to a first plurality of outputs arranged in a first elongated row which emit light in a first plane;
  - a second plurality of optical fibers arranged to direct light to a second plurality of outputs arranged in a second elongated row which emit light in a second plane; and
  - an array of light emitting diodes ("LEDs") positioned between the first plurality of outputs and the second plurality of outputs and directed to emit light between the first plane and the second plane; wherein:

the first ultrasound generator, the second ultrasound generator, and the third ultrasound generator are disposed along a curved path and spaced from the first plane, the first plurality of outputs positioned between the curved path and the array of LEDs; and the first direction, the second direction, and the third direction are angled toward the first plane whereby the first ultrasound generator, the second ultrasound generator, and the third ultrasound generator are directed to emit sound through the first plane;

applying a dental whitening composition to teeth of a mouth;

emitting light from the first plurality of outputs, the second plurality of outputs, and the array of LEDs onto the teeth substantially perpendicular to the teeth and onto the dental whitening composition; and emitting ultrasound from the first ultrasound generator, the second ultrasound generator, and the third ultrasound generator toward the teeth angled to emit the ultrasound not perpendicular to the teeth.

24. A teeth whitening apparatus comprising:
- a first plurality of optical fibers arranged to direct light to a first plurality of outputs arranged in a first row;
- a second plurality of optical fibers arranged to direct light to a second plurality of outputs arranged in a second row;
- an array of light emitting diodes ("LEDs") arranged in a third row between the first row and the second row;
- a first ultrasound generator directed to emit sound in a first direction into a particular area;
- a second ultrasound generator spaced from the first ultrasound generator on a first side of the first ultrasound generator and directed to emit sound in a second direction angled toward the first direction into the particular area; and
- a third ultrasound generator spaced from the first ultrasound generator and the second ultrasound generator on a second side of first ultrasound generator and directed to emit sound in a third direction angled toward the first direction and the second direction into the particular area, the first ultrasound generator, the second ultrasound generator and the third ultrasound generator arranged in a fourth row, the first row between the third row and the fourth row, and the first ultrasound generator, the second ultrasound generator and the third ultrasound generator are further angled to emit toward light emission paths of the first plurality of optical fibers, the second plurality of optical fibers, and the array of LEDs.

25. The teeth whitening apparatus of claim 24, further comprising a lamp, the first plurality of optical fibers positioned to direct light from the lamp to the first plurality of outputs, and the second plurality of optical fibers positioned to direct light from the lamp to the second plurality of outputs.

* * * * *

UNITED STATES PATENT AND TRADEMARK OFFICE
CERTIFICATE OF CORRECTION

PATENT NO. : 11,000,353 B2
APPLICATION NO. : 16/044481
DATED : May 11, 2021
INVENTOR(S) : Andy Hsu It is certified that error appears in the above-identified patent and that said Letters Patent is hereby corrected as shown below:

In the Claims

In Claim 1, at Column 7, Line 27, after the phrase "a second side of", insert --the--.

In Claim 14, at Column 8, Line 61, after the phrase "a second side of", insert --the--.

In Claim 16, at Column 9, Line 43, after the phrase "a second side of", insert --the--.

In Claim 21, at Column 10, Line 52, after the phrase "a second side of", insert --the--.

In Claim 23, at Column 11, Line 35, after the phrase "a second side of", insert --the--.

In Claim 24, at Column 12, Line 37, after the phrase "a second side of", insert --the--.

Signed and Sealed this
Fourteenth Day of June, 2022

Katherine Kelly Vidal
*Director of the United States Patent and Trademark Office*